(12) United States Patent
Palmby

(10) Patent No.: US 10,301,002 B2
(45) Date of Patent: May 28, 2019

(54) HOT AIR BALLOON STEERING SYSTEM

(71) Applicant: Chris D. Palmby, Bellingham, WA (US)

(72) Inventor: Chris D. Palmby, Bellingham, WA (US)

( * ) Notice: Subject to any disclaimer, the term of this patent is extended or adjusted under 35 U.S.C. 154(b) by 307 days.

(21) Appl. No.: 15/407,861

(22) Filed: Jan. 17, 2017

(65) Prior Publication Data

US 2018/0201355 A1    Jul. 19, 2018

(51) Int. Cl.
*B64B 1/42*      (2006.01)
*B64D 9/00*      (2006.01)
*B64B 1/00*      (2006.01)

(52) U.S. Cl.
CPC .............. *B64B 1/42* (2013.01); *B64B 1/005* (2013.01); *B64D 9/00* (2013.01)

(58) Field of Classification Search
CPC .............. B64B 1/42; B64B 1/005; B64D 9/00
See application file for complete search history.

(56) References Cited

U.S. PATENT DOCUMENTS

| | | | | |
|---|---|---|---|---|
| 6,648,272 B1 * | 11/2003 | Kothmann | .............. | B64B 1/005 244/30 |
| 2014/0158823 A1 * | 6/2014 | Smith | ....................... | B64B 1/44 244/1 A |
| 2016/0288894 A1 * | 10/2016 | Sehnert | ..................... | B64B 1/40 |

FOREIGN PATENT DOCUMENTS

DE            19946640 A1 *  2/2001  .............. B64B 1/02

* cited by examiner

*Primary Examiner* — Assres H Woldemaryam

(57) ABSTRACT

A hot air balloon steering system for steering a hot air balloon includes a hot air balloon that includes a basket. A stand unit is movably coupled to the basket. The stand unit abuts a support surface thereby facilitating the basket to be spaced from the support surface when the hot air balloon is not in flight. A sail unit is movably coupled to the basket. The sail unit captures air when the hot air balloon is in flight. Moreover, the sail unit steers the hot air balloon when the hot air balloon is in flight.

15 Claims, 8 Drawing Sheets

HOT AIR BALLOON STEERING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to steering devices and more particularly pertains to a new steering device for steering a hot air balloon.

BRIEF SUMMARY OF THE INVENTION

An embodiment of the disclosure meets the needs presented above by generally comprising a hot air balloon that includes a basket. A stand unit is movably coupled to the basket. The stand unit abuts a support surface thereby facilitating the basket to be spaced from the support surface when the hot air balloon is not in flight. A sail unit is movably coupled to the basket. The sail unit captures air when the hot air balloon is in flight. Moreover, the sail unit steers the hot air balloon when the hot air balloon is in flight.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
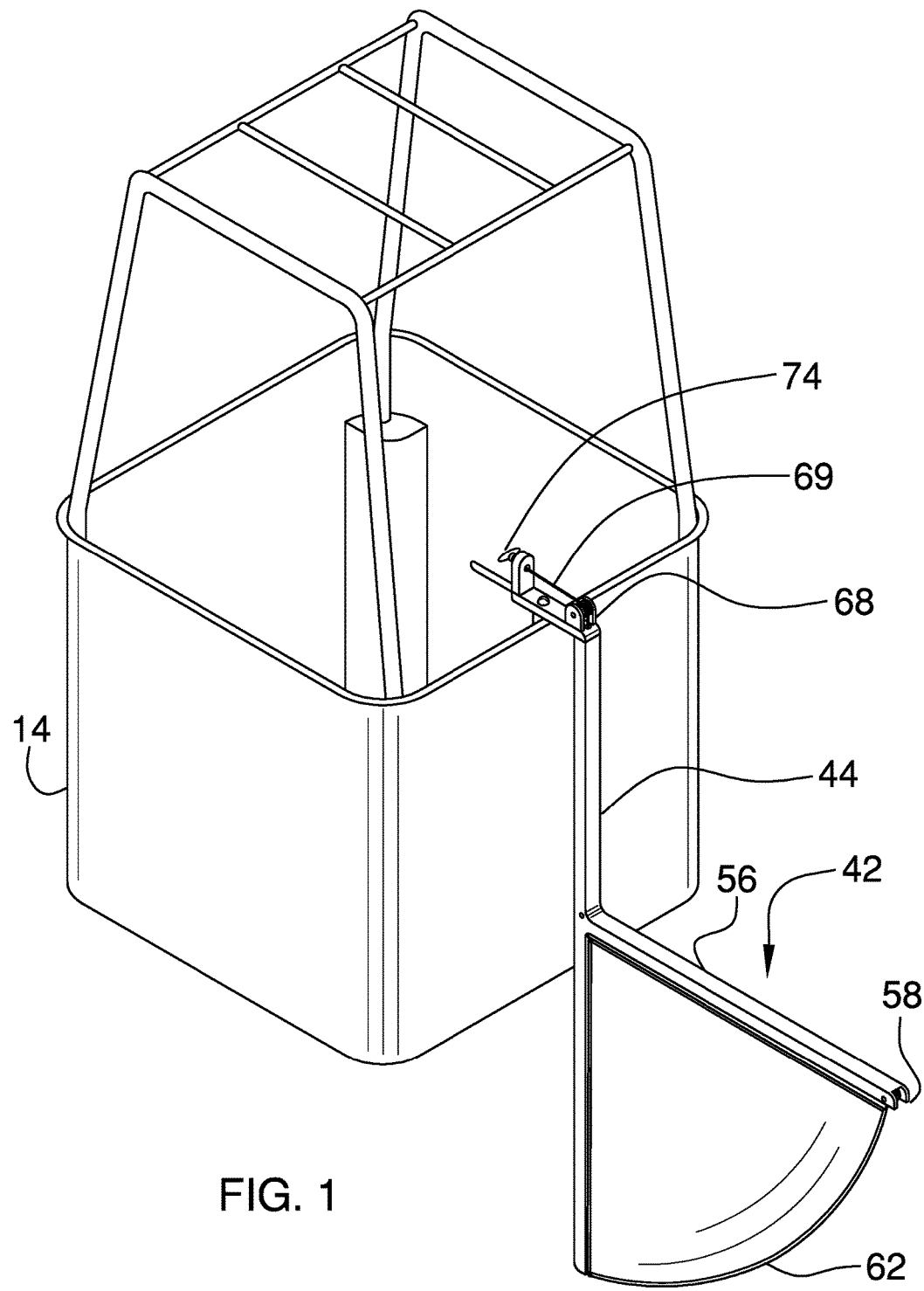
FIG. 1 is a perspective view of a hot air balloon steering system according to an embodiment of the disclosure.
Figure 2:
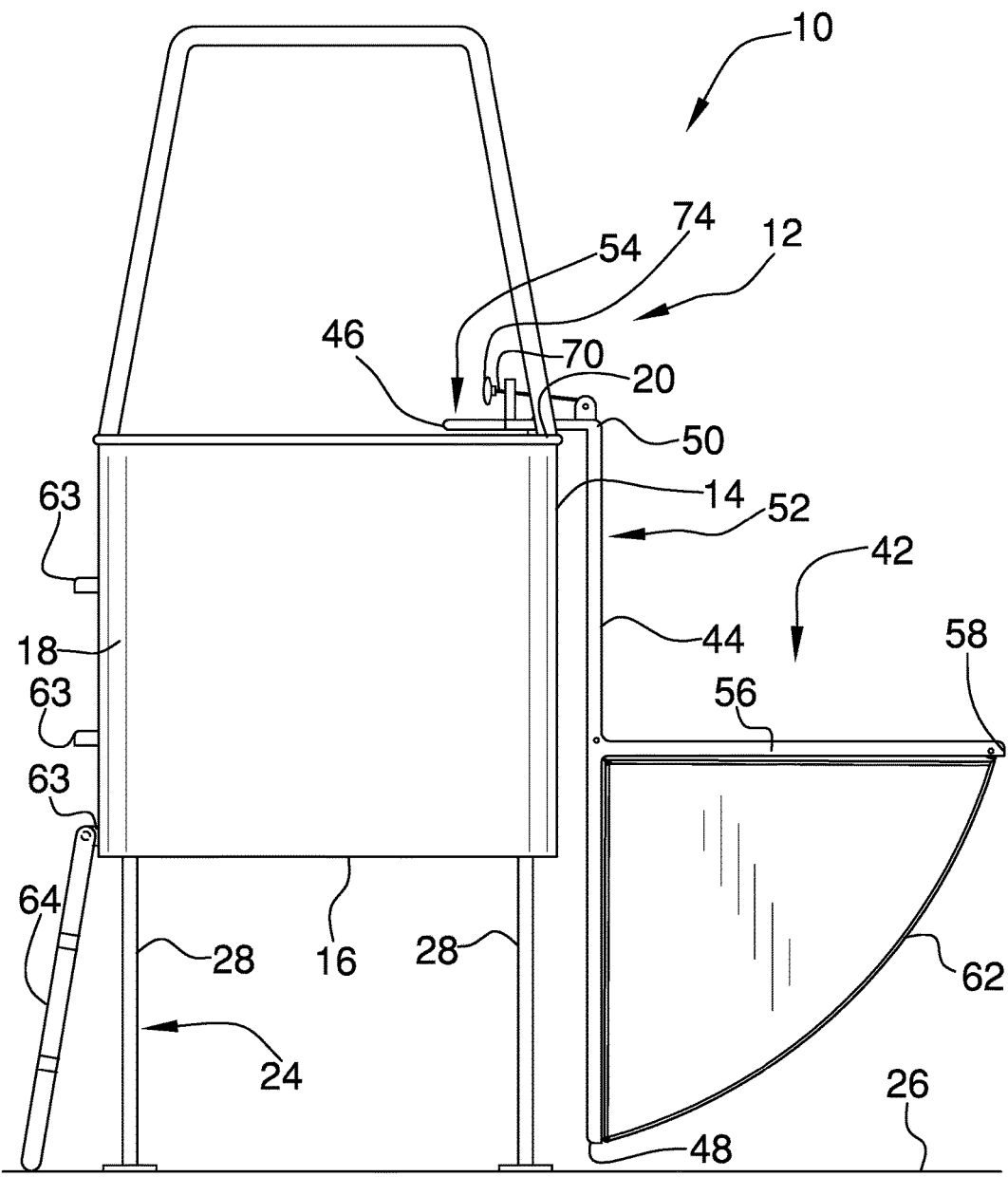
FIG. 2 is a right side view of an embodiment of the disclosure.
Figure 3:
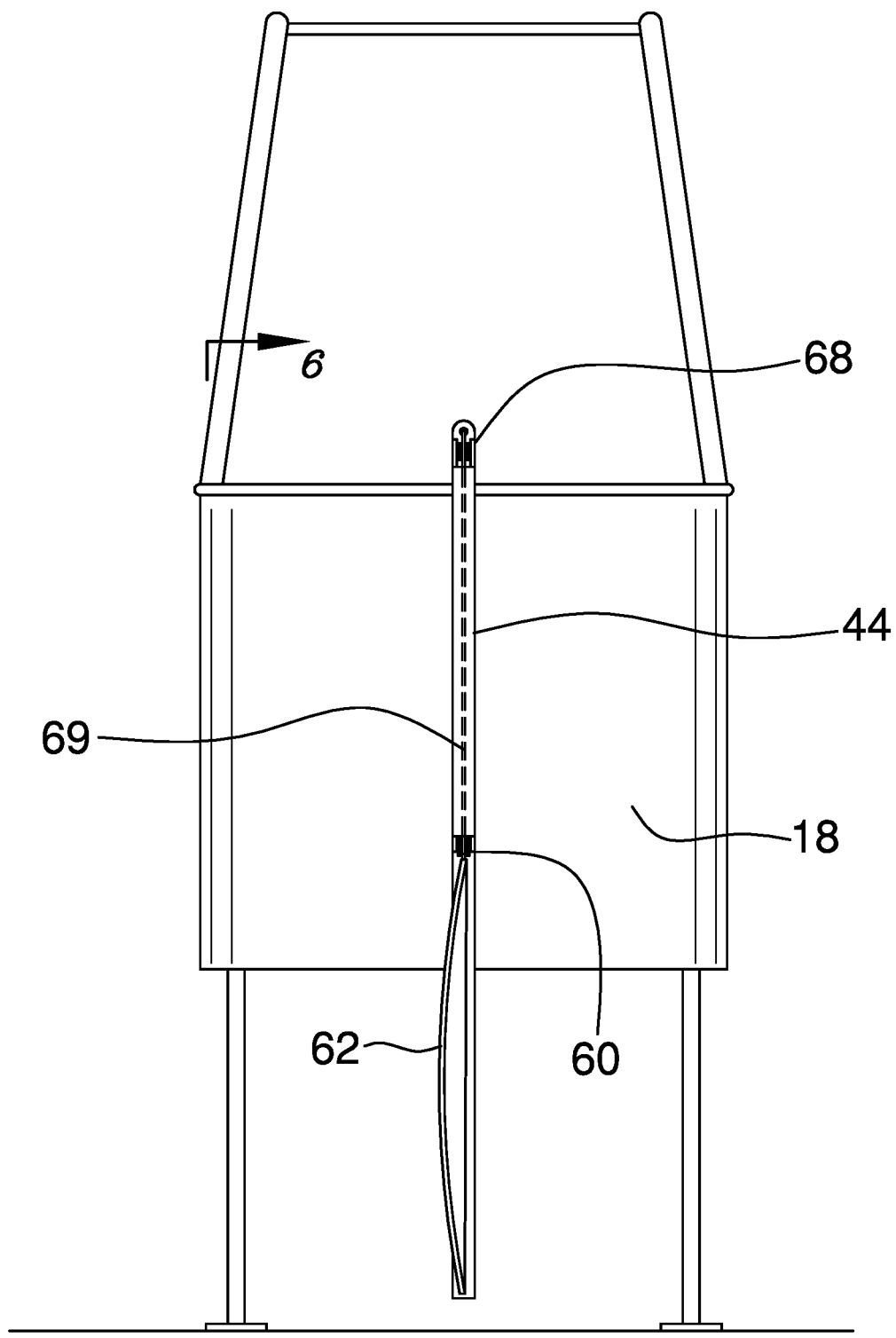
FIG. 3 is a front phantom view of an embodiment of the disclosure.
Figure 4:
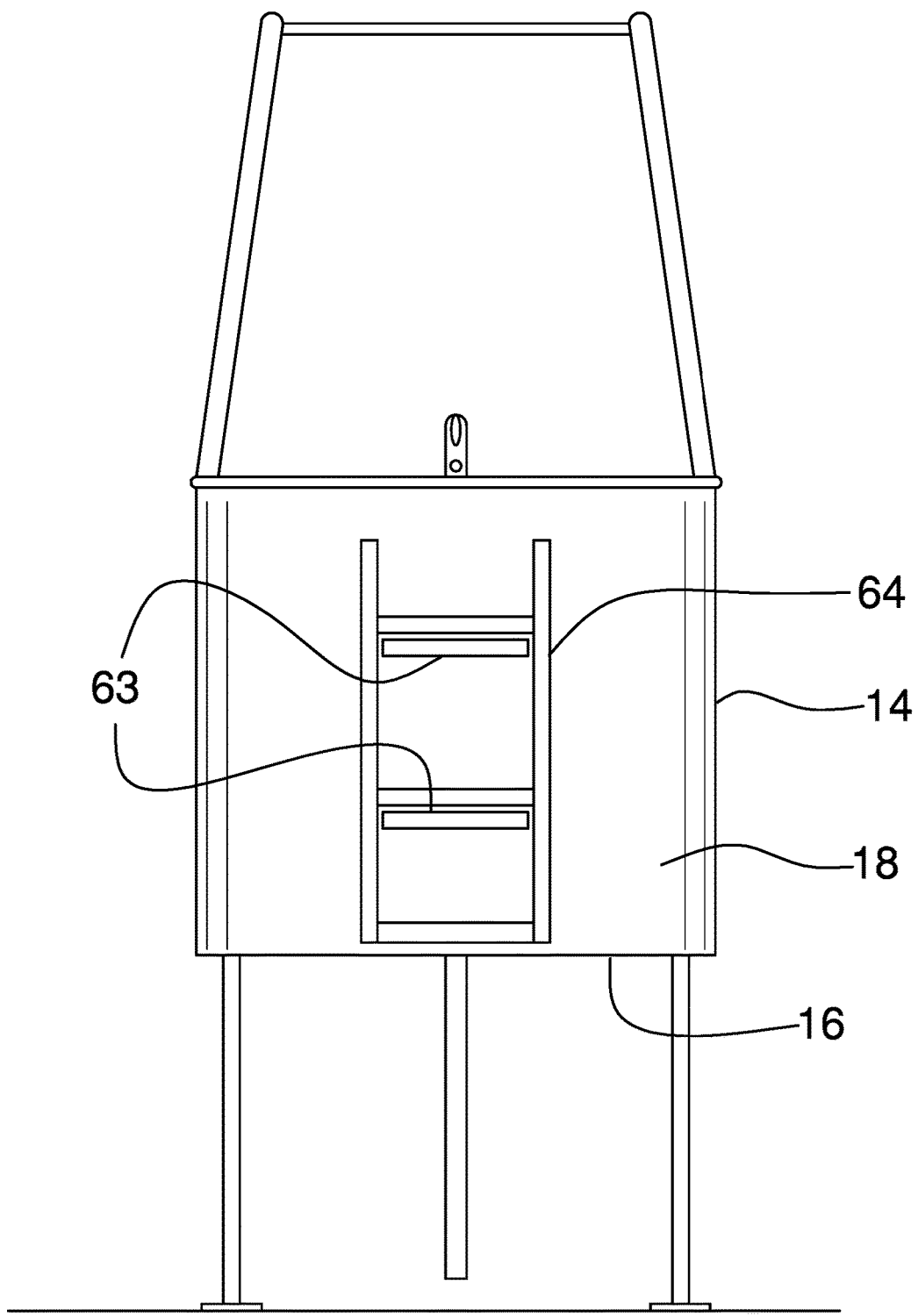
FIG. 4 is a back view of an embodiment of the disclosure.
Figure 5:
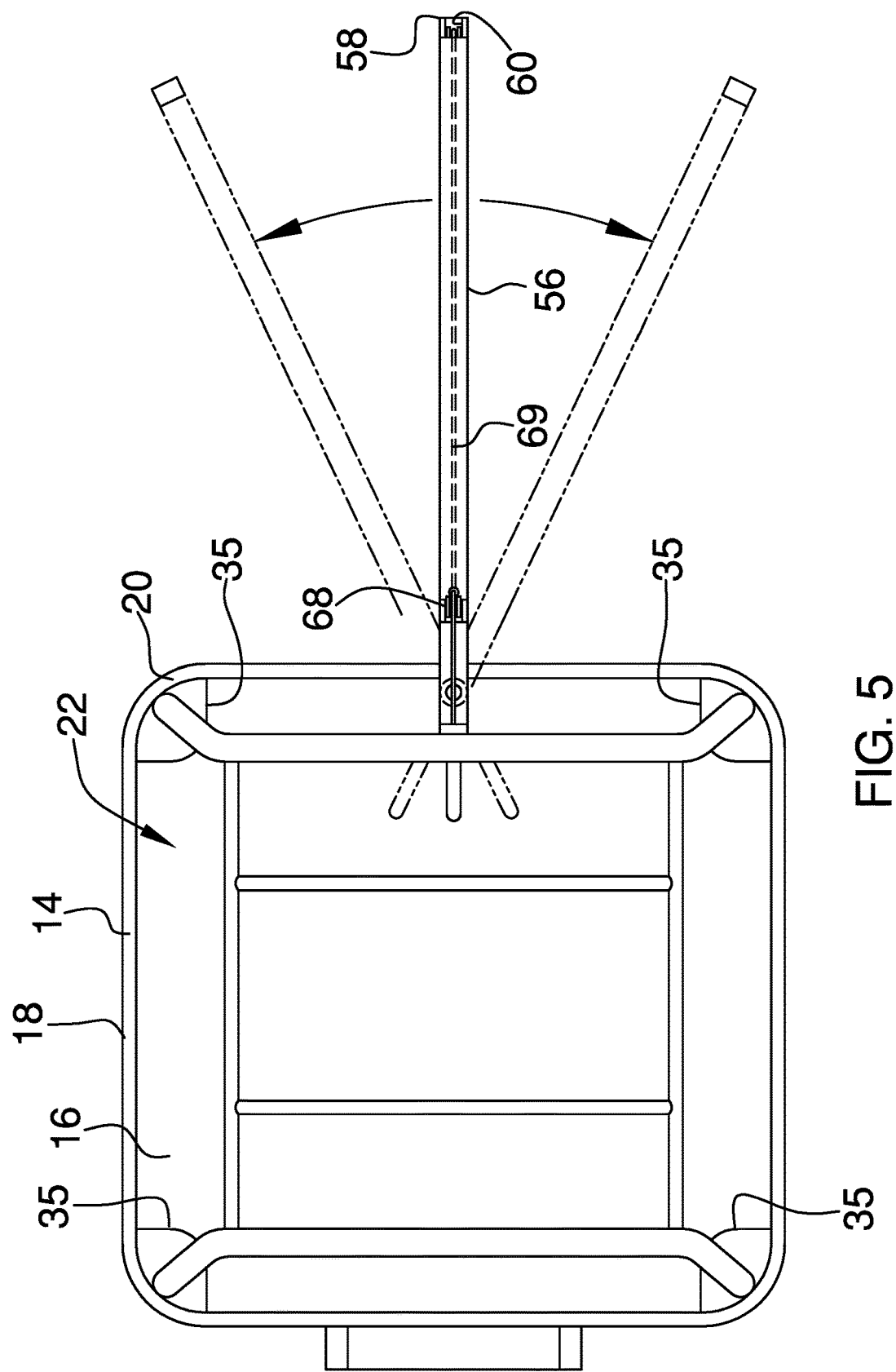
FIG. 5 is a top phantom view of an embodiment of the disclosure.
Figure 6:
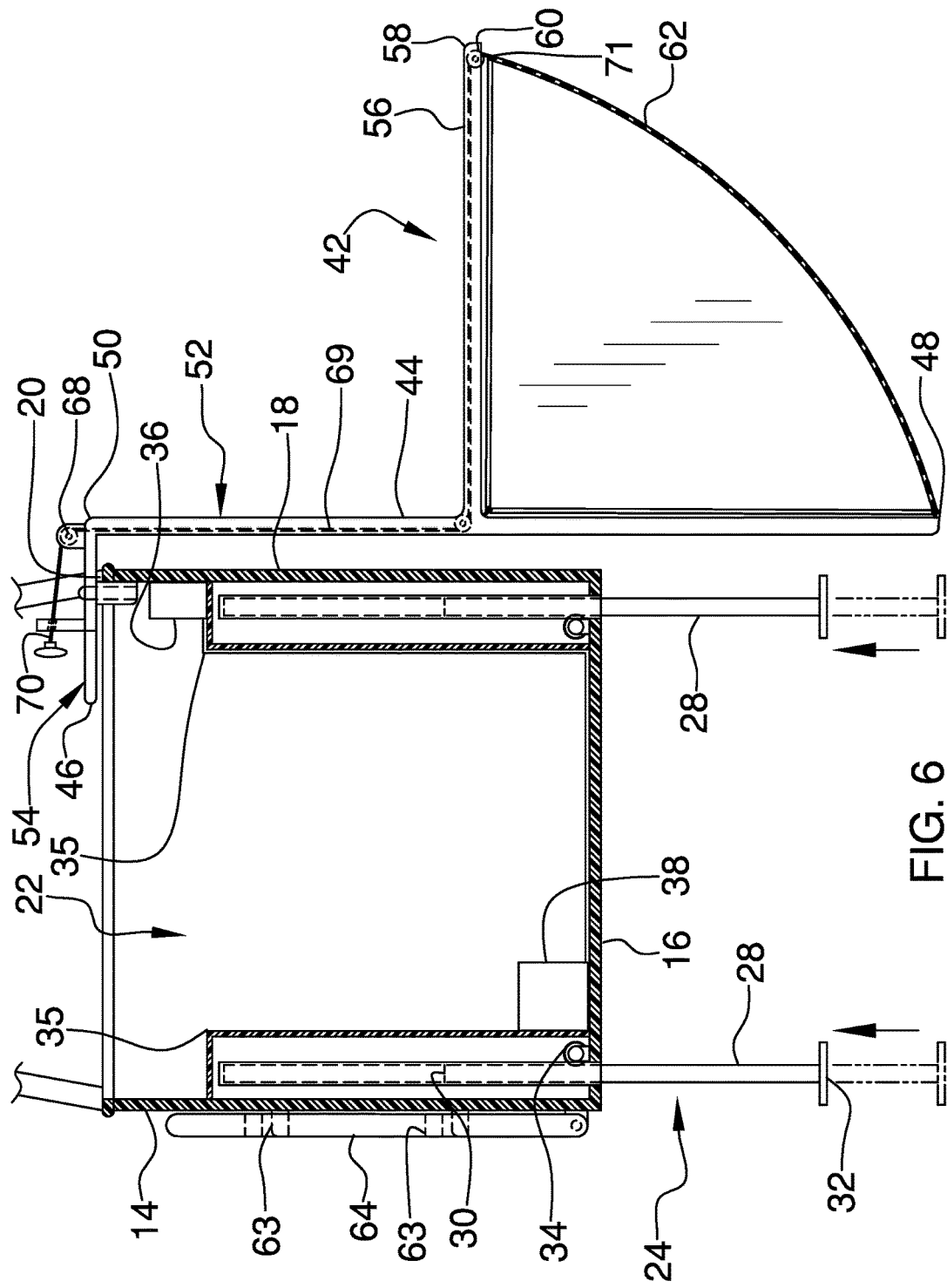
FIG. 6 is a cross sectional view taken along line 6-6 of FIG. 3 of an embodiment of the disclosure.
Figure 7:
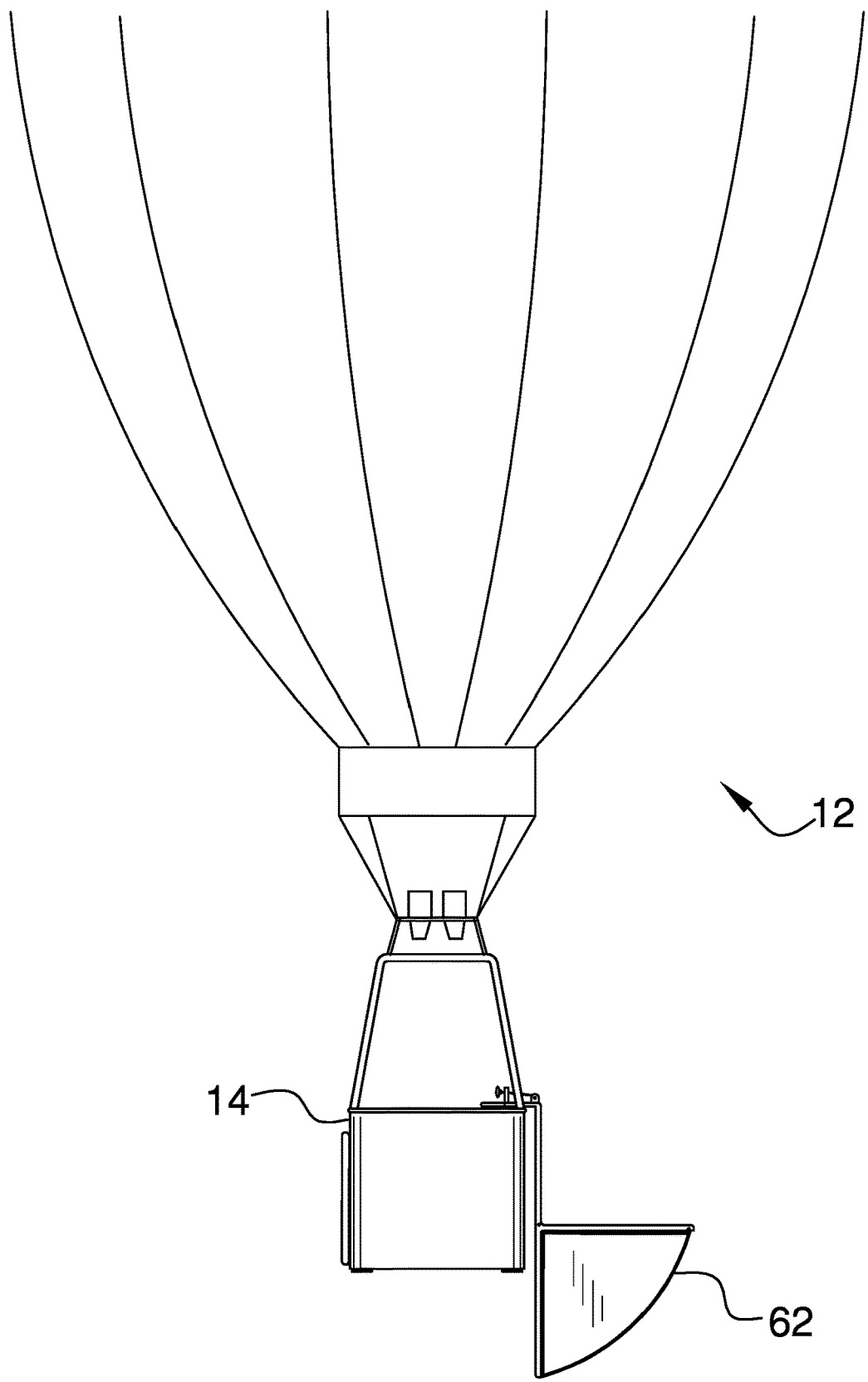
FIG. 7 is a perspective in-use view of an embodiment of the disclosure.
Figure 8:
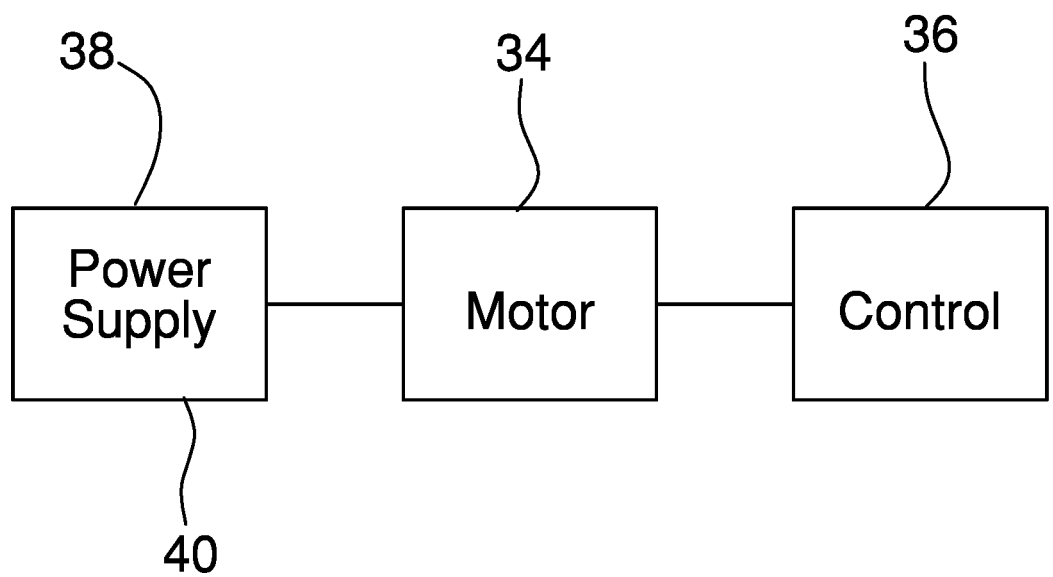
FIG. 8 is a schematic view of an embodiment of the disclosure.

With reference now to the drawings, and in particular to FIGS. 1 through 8 thereof, a new steering device embodying the principles and concepts of an embodiment of the disclosure and generally designated by the reference numeral 10 will be described.

As best illustrated in FIGS. 1 through 8, the hot air balloon steering system 10 generally comprises a hot air balloon 12 that includes a basket 14. The basket 14 has a bottom wall 16 and an outer wall 18 extending upwardly therefrom. Moreover, the outer wall 18 has a distal edge 20 with respect to the bottom wall 16 to define an opening 22 in the basket 14. The basket 14 may contain passengers when the hot air balloon 12 takes flight. The hot air balloon 12 may be a hot air balloon 12 of any conventional design.

A stand unit 24 is provided and the stand unit 24 is movably coupled to the basket 14. The stand unit 24 abuts a support surface 26 thereby facilitating the basket 14 to be spaced from the support surface 26 when the hot air balloon 12 is not in flight. The support surface 26 may be ground or the like.

The stand unit 24 comprises a plurality of legs 28 and each of the legs 28 has an upper end 30 and a lower end 32. The upper end 30 corresponding to each of the legs 28 is slidably coupled to the bottom wall 16 of the basket 14. Each of the legs 28 is selectively positioned in a deployed position having each of the legs 28 extending downwardly from said bottom wall 16. The lower end 32 corresponding to each of the legs 28 abuts the support surface 26 when each of the legs 28 is in the deployed position. Each of the legs 28 is selectively positioned in a stored position having each of the legs 28 being retracted into said basket 14.

A motor 34 is coupled to the basket 14 and the motor 34 is mechanically coupled to each of the legs 28. The motor 34 selectively urges each of the legs 28 between the deployed position and the stored position. The motor 34 may be mechanically coupled to each of the legs 28 via a cable, a complementary set of gears or any other conventional means of mechanical coupling. Moreover, the motor 34 may be a two direction electric motor 34 or the like. A plurality of the motors 34 may be provided and each of the plurality of motors 34 may be mechanically coupled to an associated one of the legs 28.

The basket 14 includes a plurality of housings 35 and each of the housings 35 is coupled to and extends upwardly from the bottom wall 16 of the basket 14. Additionally, each of the housings 35 is aligned with an associated one of four corners of the basket 14. Each of the legs 28 is retracted into an associated one of the housings 35 when the legs 28 are positioned in the stored position.

A control 36 is coupled to the basket 14 and the control 36 is selectively manipulated. The control 36 is electrically coupled to the motor 34 such that the control 36 controls operational parameters of the motor 34. The control 36 may include a switch, a lever, a button or any other conventional means of electric motor control. A power supply 38 is coupled to the basket 14 and the power supply 38 is electrically coupled to the motor 34. The power supply 38 comprises at least one battery 40.

A sail unit 42 is provided and the sail unit 42 is movably coupled to the basket 14. The sail unit 42 captures air when the hot air balloon 12 is in flight. Additionally, the sail unit 42 is manipulated to steer the hot air balloon 12 when the hot air balloon 12 is in flight.

The sail unit 42 comprises a first rod 44 that is movably coupled to the outer wall 18 of the basket 14. The first rod 44 extends between the distal edge 20 of the basket 14 and the bottom wall 16 of the basket 14. The first rod 44 has a first end 46 and a second end 48 and the first rod 44 has a bend 50 thereon to define a first portion 52 forming an angle with a second portion 54. The bend 50 is positioned closer to the first end 46 than the second end 48.

The second portion 54 is movably coupled to the distal edge 20 of the basket 14 and the second portion 54 is selectively gripped. The first portion 52 extends downwardly along the outer wall 18 of the basket 14. Moreover, the second portion 54 of the first rod 44 is selectively rotated about a vertical axis extending through the basket 14. In this way the first portion 52 of the rod is selectively urged from side to side on the basket 14.

A second rod 56 is coupled to and extends laterally away from the first rod 44 and the second rod 56 has a distal end 58 with respect to the first rod 44. A first pulley 60 is rotatably coupled to the distal end 58 of the second rod 56. A sail 62 is provided and the sail 62 is movably coupled between the first rod 44 and the second rod 56. The sail 62 is selectively positioned between a deployed position and a stored position. Moreover, the sail 62 captures air when the sail 62 is positioned in the deployed position. In this way the sail 62 urges the hot air balloon 12 to travel in a selected direction when the sail 62 is positioned in the deployed position. The sail 62 may be comprised of a deformable textile such as canvas or the like.

A plurality of steps 63 is provided and each of the steps 63 is coupled to and extends outwardly from the outer wall 18 of the basket 14 to climb into the basket 14. The steps 63 are spaced apart from each other and are distributed between the distal edge 20 of the basket 14 and the bottom wall 16 of the basket 14. A ladder 64 is hingedly coupled to a bottommost one of the steps 63 for climbing between the support surface 26 and the steps 63.

A second pulley 68 is rotatably coupled to the first portion 52 of the first rod 44. A cable 69 is provided that has a first end 70 and a second end 71. The cable 69 extends downwardly through the first portion 52 of the first rod 44 and the second rod 56. Moreover, the cable 69 extends around each of the first pulley 60 and the second pulley 68 having the first end 70 of the cable 69 being accessible from the basket 14.

A grip 74 is coupled to the first end 70 of the cable 69 and the grip 74 is selectively manipulated. The second end 71 of the cable is coupled to the sail 62 and the cable 69 is selectively urged in a first direction. The cable 69 urges the sail 62 into the deployed position having the sail 62 extending between the first rod 44 and the second rod 56. Moreover, the cable 69 is selectively urged in a second direction such that the cable 69 urges the sail 62 into the stored position having the sail 62 being collapsed against the first rod 44.

In use, the control 36 is manipulated to urge the legs 28 into the stored position when the hot air balloon 12 takes flight. The cable 69 is urged in the first direction to position the sail 62 in the deployed position. In this way the sail 62 is deployed to capture wind thereby facilitating the hot air balloon 12 to be urged in a selected direction. The second portion 54 of the first rod 44 is manipulated to position to the sail 62 at a selected point about the basket 14. In this way the hot air balloon 12 is urged to travel in the selected direction when the hot air balloon 12 is in flight. The control 36 is manipulated to urge the legs 28 into the deployed position when the hot air balloon 12 is landing. Additionally, the cable 69 is urged in the second direction to position the sail 62 in the stored position when the hot air balloon 12 is landing.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hot air balloon steering system comprising:
a hot air balloon including a basket;
a stand unit being movably coupled to said basket wherein said stand unit is configured to abut a support surface thereby facilitating said basket to be spaced from the support surface when said hot air balloon is not in flight; and
a sail unit being movably coupled to said basket wherein said sail unit is configured to capture air when said hot air balloon is in flight, said sail unit steering said hot air balloon when said hot air balloon is in flight.

2. The system according to claim 1, wherein said basket has a bottom wall and an outer wall extending upwardly therefrom, said outer wall having a distal edge with respect to said bottom wall to define an opening in said basket wherein said basket is configured to contain passengers.

3. The system according to claim 2, wherein said stand unit comprises a plurality of legs, each of said legs having an upper end and a lower end, said upper end corresponding to each of said legs being slidably coupled to said bottom wall of said basket.

4. The system according to claim 3, wherein each of said legs is selectively positioned in a deployed position having each of said legs extending downwardly from said bottom wall wherein said lower end corresponding to each of said legs is configured to abut the support surface, each of said legs being selectively positioned in a stored position having each of said legs being retracted into said basket.

5. The system according to claim 4, further comprising a motor being coupled to said basket, said motor being mechanically coupled to each of said legs such that said motor selectively urges each of said legs between said deployed position and said stored position.

6. The system according to claim 5, further comprising a control being coupled to said basket wherein said control is configured to be manipulated, said control being electrically coupled to said motor such that said control controls operational parameters of said motor.

7. The system according to claim 5, further comprising a power supply being coupled to said basket, said power supply being electrically coupled to said motor, said power supply comprising at least one battery.

8. The system according to claim 2, wherein said sail unit comprises a first rod being movably coupled to said outer wall of said basket, said first rod extending between said distal edge of said basket and said bottom wall of said basket, said first rod having a first end and a second end.

9. The system according to claim 8, wherein said first rod has a bend thereon to define a first portion forming an angle with a second portion, said second portion being movably coupled to said distal edge of said basket wherein said second portion is configured to be gripped, said first portion extending downwardly along said outer wall of said basket.

10. The system according to claim 8, further comprising a second rod being coupled to and extending laterally away from said first rod, said second rod having a distal end with respect to said first rod, said second rod being centrally positioned on said first rod.

11. The system according to claim 10, further comprising a sail being hingedly coupled to between said first rod and said second rod, said sail being selectively positioned in a deployed position wherein said sail is configured to capture air, said sail being selectively positioned in a stored position, said sail urging said hot air balloon to travel is a selected direction when said sail is positioned in said deployed position.

12. The system according to claim 9, further comprising a second pulley being rotatably coupled to said first portion of said first rod.

13. The system according to claim 11, further comprising:
a first pulley being rotatably coupled to said distal end of said second rod;
a second pulley; and
a cable extending downwardly through said first portion of said first rod and said second rod, said cable extending over said first pulley and said second pulley, said second end of said cable being coupled to said sail.

14. The system according to claim 13, further comprising a grip being coupled to said first end of said cable wherein said grip is configured to be manipulated, said cable being selectively urged in a first direction such that said cable urges said sail into a deployed position, said cable being selectively urged in a second direction such that said cable urges said sail into a stored position.

15. A hot air balloon steering system comprising:
a hot air balloon including a basket, said basket having a bottom wall and an outer wall extending upwardly therefrom, said outer wall having a distal edge with respect to said bottom wall to define an opening in said basket wherein said basket is configured to contain passengers;
a stand unit being movably coupled to said basket wherein said stand unit is configured to abut a support surface thereby facilitating said basket to be spaced from the support surface when said hot air balloon is not in flight, said stand unit comprising:
a plurality of legs, each of said legs having an upper end and a lower end, said upper end corresponding to each of said legs being slidably coupled to said bottom wall of said basket, each of said legs being selectively positioned in a deployed position having each of said legs extending downwardly from said bottom wall wherein said lower end corresponding to each of said legs is configured to abut the support surface, each of said legs being selectively positioned in a stored position having each of said legs being retracted within basket,
a motor being coupled to said basket, said motor being mechanically coupled to each of said legs such that said motor selectively urges each of said legs between said deployed position and said stored position,
a control being coupled to said basket wherein said control is configured to be manipulated, said control being electrically coupled to said motor such that said control controls operational parameters of said motor, and
a power supply being coupled to said basket, said power supply being electrically coupled to said motor, said power supply comprising at least one battery; and
a sail unit being movably coupled to said basket wherein said sail unit is configured to capture air when said hot air balloon is in flight, said sail unit steering said hot air balloon when said hot air balloon is in flight, said sail unit comprising:
a first rod being movably coupled to said outer wall of said basket, said first rod extending between said distal edge of said basket and said bottom wall of said basket, said first rod having a first end and a second end, said first rod having a bend thereon to define a first portion forming an angle with a second portion, said second portion being movably coupled to said distal edge of said basket wherein said second portion is configured to be gripped, said first portion extending downwardly along said outer wall of said basket,
a second rod being coupled to and extending laterally away from said first rod, said second rod having a distal end with respect to said first rod, said second rod being centrally positioned on said first rod;
a sail being hingedly coupled to between said first rod and said second rod, said sail being selectively positioned in a deployed position wherein said sail is configured to capture air, said sail being selectively positioned in a stored position, said sail urging said hot air balloon to travel is a selected direction when said sail is positioned in said deployed position, said sail extending between said second rod and said second end of said first rod;
a stem being coupled to and extending upwardly from said second portion of said first rod, said stem having a distal end with respect to said first rod,
a first pulley being rotatably coupled to said distal end of said second rod, a second pulley being rotatably coupled to said first portion of said first rod, a cable having a first end and a second end, said cable extending downwardly through said first portion of said first rod and said second rod, said cable extending over said first pulley and said second pulley, said second end of said cable being coupled to said sail such that said cable selectively urges said sail between said stored position and said deployed position, a grip being coupled to said first end of said cable wherein said grip is configured to be manipulated, said cable being selectively urged in a first direction such that said cable urges said sail into said deployed position, said cable being selectively urged in a second direction such that said cable urges said sail into said stored position.

* * * * *